United States Patent
Erhard et al.

(10) Patent No.: US 11,597,268 B2
(45) Date of Patent: Mar. 7, 2023

(54) MODULAR PLASTIC CONTAINER

(71) Applicant: Bayerische Motoren Werke Aktiengesellschaft, Munich (DE)

(72) Inventors: Daniel Erhard, Fuerstenfeldbruck (DE); Joerg Schneppenheim, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 91 days.

(21) Appl. No.: 16/963,737

(22) PCT Filed: Dec. 5, 2018

(86) PCT No.: PCT/EP2018/083568
§ 371 (c)(1),
(2) Date: Jul. 21, 2020

(87) PCT Pub. No.: WO2019/145076
PCT Pub. Date: Aug. 1, 2019

(65) Prior Publication Data
US 2021/0078402 A1    Mar. 18, 2021

(30) Foreign Application Priority Data
Jan. 29, 2018   (DE) .................... 10 2018 201 272.5

(51) Int. Cl.
*B60K 15/073*    (2006.01)
*B60K 15/03*    (2006.01)
(Continued)

(52) U.S. Cl.
CPC .. *B60K 15/03177* (2013.01); *B29C 45/14336* (2013.01); *B29L 2031/7172* (2013.01);
(Continued)

(58) Field of Classification Search
CPC ........ B60K 2015/03039; B60K 15/073; B60K 2015/0638; B60K 2015/03164;
(Continued)

(56) References Cited

U.S. PATENT DOCUMENTS

| 3,934,747 A | 1/1976 | Needt |
| 5,567,296 A | 10/1996 | Luch |

(Continued)

FOREIGN PATENT DOCUMENTS

| DE | 2 233 839 A1 | 4/1974 |
| DE | 10 2005 060 246 A1 | 6/2007 |

(Continued)

OTHER PUBLICATIONS

PCT/EP2018/083568, International Search Report dated Mar. 28, 2019 (Three (3) pages).
(Continued)

*Primary Examiner* — Stephen J Castellano
(74) *Attorney, Agent, or Firm* — Crowell & Moring LLP

(57) ABSTRACT

A plastics container of modular construction includes a first plastics segment and a second plastics segment. The first and second plastics segments are connected to one another by plastics welding. At least one of the first and second plastics segments has a paintable surface layer on an outer side thereof or is comprised of a paintable material.

6 Claims, 3 Drawing Sheets

(51) Int. Cl.
*B29C 45/14* (2006.01)
*B29L 31/00* (2006.01)
*B62J 35/00* (2006.01)

(52) U.S. Cl.
CPC ............... *B60K 2015/03039* (2013.01); *B60K 2015/0346* (2013.01); *B60K 2015/03164* (2013.01); *B60K 2015/03493* (2013.01); *B62J 35/00* (2013.01)

(58) Field of Classification Search
CPC .. B60K 2015/0346; B60K 2015/03493; B60K 15/03177; B62J 35/00; B29C 45/14336
See application file for complete search history.

(56) References Cited

U.S. PATENT DOCUMENTS

| | | | |
|---|---|---|---|
| 5,884,380 A | | 3/1999 | Thurm |
| 7,857,928 B1* | | 12/2010 | Mackey ................... B62J 35/00 428/34.7 |
| 2004/0009315 A1 | | 1/2004 | Potter et al. |
| 2011/0233225 A1 | | 9/2011 | Goto |
| 2016/0039282 A1* | | 2/2016 | Mathew ............... B60K 15/067 248/313 |
| 2017/0217075 A1 | | 8/2017 | De Keyzer et al. |
| 2017/0341699 A1 | | 11/2017 | Nakagawa et al. |
| 2019/0092414 A1* | | 3/2019 | Tabuchi .................. B32B 27/08 |

FOREIGN PATENT DOCUMENTS

| | | |
|---|---|---|
| DE | 10 2006 056 430 A1 | 5/2008 |
| DE | 20 2008 012 978 U1 | 3/2010 |
| EP | 1 974 975 A1 | 10/2008 |
| EP | 2 592 327 A1 | 5/2013 |
| GB | 840 724 A | 7/1960 |
| JP | 10-181655 A | 7/1998 |
| JP | 10-181658 A | 7/1998 |
| WO | WO 02/09924 A1 | 2/2002 |

OTHER PUBLICATIONS

German Search Report issued in German application No. 10 2018 201 272.5 dated Apr. 6, 2018, with Statement of Relevancy (Eight (8) pages).

English-language Chinese Office Action issued in Chinese application No. 201880087160.0 dated Oct. 8, 2022 (Eight (8) pages).

English-language Chinese Office Action issued in Chinese application No. 201880087160.0 dated Jan. 5, 2023 (Six (6) pages).

* cited by examiner

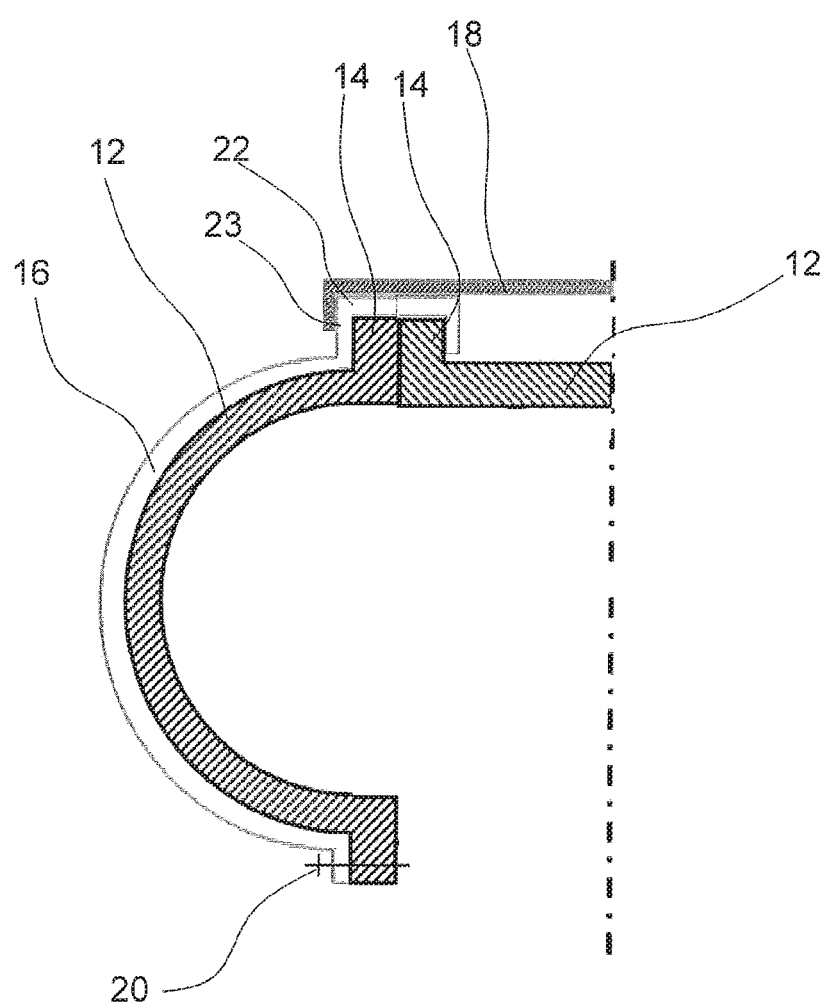

MODULAR PLASTIC CONTAINER

This application is the national stage (Rule 371) of international application No. PCT/EP2018/083568 filed 5 Dec. 2018, which claims the benefit of foreign priority of German application No. DE 102018201272.5 filed 29 Jan. 2018.

BACKGROUND AND SUMMARY OF THE INVENTION

The invention relates to a plastics container of modular construction, in particular a plastics container for a motor vehicle.

It is common for containers for motor vehicles which have at least one surface which is visible to the outside to be painted at least in the visible region. Such a container may for example be a fuel tank for a motorcycle.

To achieve a high-quality appearance, such containers are manufactured from a readily paintable material, for example from a metal. Such containers are however expensive and have a high weight.

It is therefore an object of the present invention to provide a container for a motor vehicle which has a low weight, can be produced inexpensively and at the same time has a readily paintable surface.

The object is achieved according to the invention by means of a plastics container of modular construction, comprising at least two plastics segments which are connected to one another by means of plastics welding, wherein at least one of the plastics segments has a paintable surface layer on its outer side or is composed of a paintable material.

Such a container has the advantage that, through the use of plastics segments, it is possible to achieve a low overall weight, and the overall production costs are low. It is possible for only those plastics segments which are situated in a visible region to be provided with a paintable surface layer or manufactured from a paintable material. Thus, a high-quality visual appearance is provided for a customer. In particular, it is possible to utilize specific advantages of the surface layer.

As a result of the division of the plastics container into individual plastics segments, it is furthermore possible to easily paint individual regions of the plastics container. For example, the individual plastics segments can be painted prior to the welding process. In this way, a masking of individual regions during the painting process can be omitted.

It is particularly advantageous if the plastics segments are formed such that, in an installed state of the plastics container, at least one plastics segment is situated virtually entirely in a visible region, whereas at least one further plastics segment is completely concealed. In this way, it is possible to provide the visible regions with a particularly high-quality surface, whereas the plastics segments in the concealed region remain free from paint or a surface layer and can thus be particularly inexpensive.

In one embodiment, the paintable surface layer may be a metal plate or a metal foil. Paints generally adhere particularly well to metallic materials. It is furthermore possible for metal plates to be provided with an individual design. For example, the metal plate may be provided with an individual engraving or paintwork. A customer can engrave their name or have a family crest or company logo painted onto the metal plate. Such individualization can be performed very easily by retroactive installation of the metal plate at a dealership. Furthermore, by means of a metal plate, the stability of a plastics segment can be improved. It is thus possible to combine the economic advantages of plastic with the visual and structural advantages of metal.

The metal plate preferably has a small wall thickness. This is possible because the metal faceplate itself does not have to perform any container function. For the same reason, during the production of the metal faceplate, a high degree of stretching can be realized in order to implement high-quality design forms.

For example, the paintable surface layer is composed of aluminum or titanium. These materials are perceived as being of particularly high quality and can also at least partially remain free from paintwork. In a particularly inexpensive embodiment, the paintable surface layer may be formed from sheet steel.

In a further embodiment, the paintable surface layer may have plastic or be composed of plastic. For example, the paintable surface layer is a plastics molded part or a plastics film. The plastics segment may in this case be composed of a main body and of a surface layer, wherein the main body has a first plastics component and the surface layer has a second plastics component which differs in terms of its composition from the first plastics component. A container with a surface layer composed of plastic can have a particularly low weight in relation to a container with metallic components. The paintable surface layer is preferably back-molded with plastic. Since stiffening means can be easily integrated into plastics molded parts, it is thus possible to realize a particularly high degree of stability of the individual plastics segments and consequently a high degree of stability of the container as a whole. During the back-molding process, the plastic can be connected directly to the surface layer without the need for additional connecting elements. In particular, the back-molded plastic can adhere to the surface layer.

In a further variant, the surface layer may be installed on a plastics segment with the aid of at least one connecting means. For example, the surface layer may be screwed, riveted or adhesively bonded to a plastics element. In this way, the connection of the surface layer to the plastics segment is particularly reliable. The use of a releasable connecting means, for example a screw, has the additional advantage that, in the event of damage to the surface layer, this can be easily and inexpensively exchanged.

In order to be able to install the surface layer on a plastics element particularly easily, the surface layer may have at least one installation element. For example, the installation element comprises a hook. The installation element may serve for the suspension or detent engagement of the surface layer on a plastics segment. The installation element serves in particular for pre-installing the surface layer, for example by virtue of the surface layer being suspended on a plastics segment by means of the installation element before the surface layer is fixedly connected to the plastics segment with the aid of a connecting means. By means of the at least one installation element, it is consequently possible for the installation of the surface layer to be simplified, and for the number of required connecting means to be reduced.

Each of the plastics segments may have at least one at least partially encircling welding flange. The welding flanges serve for the connection of the plastics segments by means of plastics welding.

The plastics container may have at least three plastics segments, wherein at least one plastics segment is formed as a central part which is open on two sides, and at least two further plastics segments are formed as covers which are open on one side, and the covers are arranged at both sides on the central part. This has the advantage that even complex geometries of the plastics container can be implemented without the need for complex tools.

The plastics container may for example be a fuel tank, in particular for a motorcycle. In motorcycles, the tank is commonly arranged in a region between a handlebar and a seat surface and has an outwardly visible painted surface. By means of the invention, the advantages of plastic can be combined with the visual characteristics of metallic or other materials.

The plastics container is preferably covered at least in certain regions by means of a faceplate. The faceplate may have a protective function. For example, the faceplate is manufactured from metal and is likewise painted. In the case of a fuel tank, for example a fuel tank for a motorcycle, the faceplate may protect the tank against damage in the event of an impact against the ground. In particular, there is the risk of the plastics container being damaged by stones or other sharp objects. Through the use of a faceplate, it is possible for the plastics container to have only a small wall thickness and to nevertheless be protected against damage. Furthermore, in the case of maintenance, the repair costs can be kept low, because only the faceplate and not the entire plastics container has to be exchanged.

Further features and advantages of the invention will emerge from the following description and from the following drawings, to which reference is made.

BRIEF DESCRIPTION OF THE DRAWINGS

FIG. 2 schematically shows a plastics segment for a plastics container according to the invention.

DETAILED DESCRIPTION OF THE DRAWINGS

Figure 1:
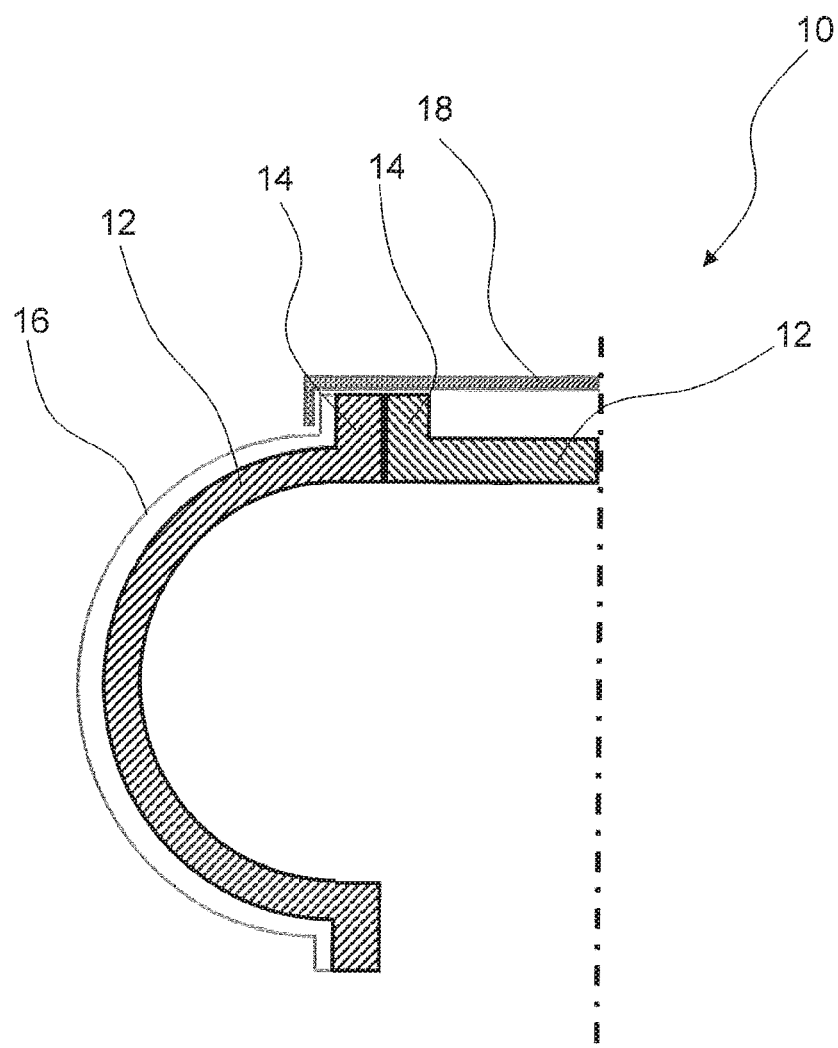
FIG. 1 schematically shows a partial section through a plastics container according to the invention.

FIG. 1 shows a partial section through a modular plastics container 10 which has at least two plastics segments 12. The plastics container 10 may be a fuel tank.

The plastics segments are for example formed in an inexpensive manner as injection molded parts. In order to connect the plastics segments 12 to one another, these may for example be welded to one another, in particular by means of plastics welding, along at least partially encircling welding flanges 14.

A paintable surface layer 16 is arranged on one of the two plastics segments 12. The paintable surface layer 16 may be a metal plate, a metal foil, a plastics molded part, a plastics film or the like. In this way, it is possible for the plastics container 10 to be manufactured, and provided with a high-quality surface, in an inexpensive manner. Here, the paintable surface layer 16 need not imperatively be completely painted. It is also possible for only a part of the surface layer 16 to be painted. For example, the surface layer 16 may have a particularly high-quality material such as aluminum or titanium. It is furthermore possible for the surface layer 16 to be engraved in a customer-specific manner.

In the embodiment shown, the paintable surface layer is back-molded. In particular, the plastics segment 12 and the paintable surface layer 16 are connected to one another.

In addition to the paintable surface layer 16, a faceplate 18 is arranged on the plastics container 10. The faceplate 18 may likewise be painted but primarily has a protective function. In particular, the faceplate 18 may have a high strength. In this way, those plastics segments 12 of the plastics container 10 which are situated under the faceplate 18 can have a small thickness and thus be of material-saving, inexpensive and lightweight form. If required, for example in the event of an impact against the plastics container 10, the faceplate 18 protects the plastics segments 12 situated under it against damage. At the same time, the faceplate 18 simplifies maintenance, because the faceplate 18 can be easily exchanged.

FIG. 2 shows a plastics segment 12 for a plastics container 10, in the case of which, by contrast to the embodiment shown in FIG. 1, the paintable surface layer 16 is not back-molded, but rather the surface layer 16 is fastened to the plastics segment 12 with the aid of a connecting means 20. The connecting means is only schematically illustrated in FIG. 2. This may be a screw, a rivet or the like. Alternatively, the paintable surface layer 16 may also be adhesively bonded to the plastics segment 12.

In order to simplify the installation of the paintable surface layer 16 on the plastics segment 12, the paintable surface layer 16 has an installation element 22, in particular a hook 23. The paintable surface layer 16 can be pre-installed, in particular suspended, on the plastics segment 12 by means of the hook 23. Thus, the connecting means 20 can be easily attached without the need for the surface layer 16 to be held in its position by a technician during the installation process.

Figure 3A:
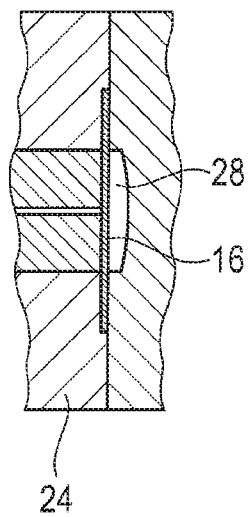
FIGS. 3a to 3c schematically show different method steps of a possible method for producing a plastics container according to the invention.
Figure 3B:
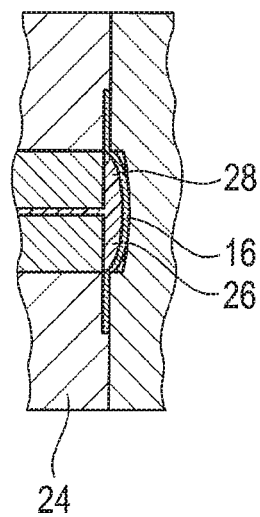
Figure 3C:
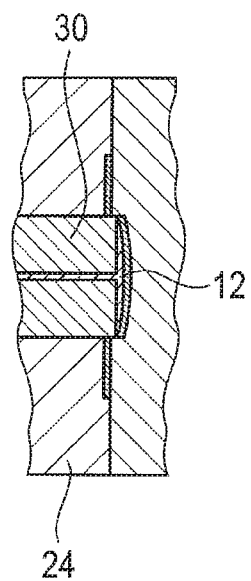

FIGS. 3a to 3c schematically show different method steps of a possible method for the production of a plastics container 10 according to the invention, in particular the production of a plastics segment 12. The advantage of the described method lies in the combination of multiple working steps. It is however also possible for the plastics segment 12 to be produced sequentially in a conventional manner.

In a first step shown in FIG. 3a, the material for a paintable surface layer 16 is placed into a two-part tool mold 24.

Subsequently, as shown in FIG. 3b, the paintable surface layer 16 is, by means of a plastics melt 26 which is injected at high pressure into a cavity 28, forced into the cavity 28 and thus deformed. Alternatively, the paintable surface layer may be deformed, for example by deep drawing, already before being placed into the tool mold 24 or before the injection of the melt 26.

In a further method step, which is shown in FIG. 3c, the plastics melt 26 is compressed by means of an embossing die 30. Subsequently, the plastics segment 12 can be removed from the tool mold 24. Any excess material can be removed by stamping.

What is claimed is:

1. A plastics container of modular construction installed in a motor vehicle, comprising:
   a first plastics segment, wherein the first plastics segment is visible from an outside of the motor vehicle;
   a second plastics segment, wherein the second plastics segment is not visible from the outside of the motor vehicle;
   wherein the first and second plastics segments are connected to one another by plastics welding; and
   a surface layer disposed directly on the first plastics segment, wherein the surface layer is a metal plate or a metal foil and wherein the surface layer is not disposed on the second plastics segment;

wherein the surface layer disposed directly on the first plastics segment that is visible from the outside of the motor vehicle is painted; and wherein the second plastics segment that is not visible from the outside of the motor vehicle is not painted.

2. The plastics container according to claim 1, wherein the metal plate or the metal foil is installed on the first plastics segments by a connector.

3. The plastics container according to claim 2, wherein the surface layer has an installation element.

4. The plastics container according to claim 1, wherein the first and second plastics segments each have a partially encircling welding flange.

5. The plastics container according to claim 1, wherein the plastics container is a fuel tank, wherein the motor vehicle is a motor cycle, and wherein the fuel tank is disposed in a region of the motor cycle between a handlebar of the motor cycle and a seat surface of the motor cycle.

6. The plastics container according to claim 1 in combination with a faceplate, wherein the plastics container is covered at least in a region by the faceplate.

\* \* \* \* \*